United States Patent
Iketani

(10) Patent No.: US 6,712,580 B2
(45) Date of Patent: Mar. 30, 2004

(54) SEAL APPARATUS FOR A WATER PUMP, ROTATION-SUPPORT APPARATUS FOR A WATER PUMP, AND A WATER PUMP

(75) Inventor: Masamichi Iketani, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/246,671

(22) Filed: Sep. 19, 2002

(65) Prior Publication Data

US 2003/0044269 A1 Mar. 6, 2003

Related U.S. Application Data

(63) Continuation of application No. 09/989,520, filed on Nov. 21, 2001, now abandoned, which is a continuation of application No. PCT/JP01/07739, filed on Sep. 4, 2001.

(30) Foreign Application Priority Data

Sep. 4, 2001 (JP) ........................................ 2001-266714

(51) Int. Cl.⁷ .............................................. F04D 29/12
(52) U.S. Cl. ..................... 415/113; 415/111; 415/168.2; 415/229; 415/230; 415/231; 277/394; 277/423; 277/551; 277/560; 277/562; 384/478; 384/485; 384/486
(58) Field of Search ................................ 415/111, 113, 415/168.2, 174.2, 229, 230, 231; 377/423, 551, 560, 562, 572, 371, 394; 384/478, 484, 485, 486

(56) References Cited

U.S. PATENT DOCUMENTS

| | | |
|---|---|---|
| 4,073,596 A | 2/1978 | Erickson et al. |
| 4,171,137 A | 10/1979 | Aizu et al. |
| 5,209,499 A * | 5/1993 | Ruff, Jr. et al. ............. 384/486 |
| 5,558,491 A | 9/1996 | Andrews |
| 5,865,597 A | 2/1999 | Ozawa |
| 5,890,881 A | 4/1999 | Adeff |
| 5,927,720 A | 7/1999 | Zinsmeyer et al. |
| 5,975,534 A * | 11/1999 | Tajima et al. ................ 277/572 |
| 6,056,293 A | 5/2000 | Visconti |
| 6,062,815 A | 5/2000 | Holt et al. |
| 6,120,243 A | 9/2000 | Tanabe |
| 6,149,158 A * | 11/2000 | Tripathy ...................... 277/551 |
| 6,270,312 B1 | 8/2001 | Heer |
| 6,485,256 B1 * | 11/2002 | Iketani ........................ 415/113 |

FOREIGN PATENT DOCUMENTS

| | | | |
|---|---|---|---|
| DE | 3616999 A1 * | 11/1987 | ................ 384/484 |
| JP | 4-89892 | 8/1992 | |
| JP | 8-254213 | 10/1996 | |
| JP | 9-021396 A | 1/1997 | |
| JP | 11-153096 | 6/1999 | |
| JP | 11-173337 A | 6/1999 | |

* cited by examiner

*Primary Examiner*—Christopher Verdier
(74) *Attorney, Agent, or Firm*—Crowell & Moring LLP

(57) ABSTRACT

A structure of a water pump is provided without increasing the cost thereof, or without enlarging the size to improve the durability of the water pump. A seal apparatus having a seal ring 13 and a slinger 14 in combination to prevent foreign matter from progressing into the rolling bearing 6a. The amount of compression δ of the second seal lip 23, which occurs when the tip edge of the second seal lip 23 of the seal ring 13 comes in contact with the outer peripheral surface of the outer-diameter-side cylindrical section 26 that is formed at the outer peripheral edge of the slinger 14, is at least 1/10 and up to 7/10 the height of the second seal lip 23 in the free state. In addition, the roughness of a portion of the outer peripheral surface of the outer-diameter-side cylindrical section 26 which the tip edge of the second seal lip 23 comes in sliding contact with is from 0.2 μm to 2.0 μm in the arithmetic mean Ra, or is from 0.8 μm to 8.0 μm in the maximum height Ry.

3 Claims, 5 Drawing Sheets

US 6,712,580 B2

SEAL APPARATUS FOR A WATER PUMP, ROTATION-SUPPORT APPARATUS FOR A WATER PUMP, AND A WATER PUMP

This application is a continuation of application Ser. No. 09/989,520, filed Nov. 21, 2001, now abandoned, which is a continuation of International Application PCT/JP01/07739, filed Sep. 4, 2001.

TECHNICAL FIELD OF THE INVENTION

This invention relates to a seal apparatus for a water pump and a rotation-support apparatus for a water pump and a water pump, and more particularly to improvement of the seal apparatus of a water pump that is used for circulating coolant water for an automobile engine.

BACKGROUND TECHNOLOGY

A water pump used for circulating coolant water for an automobile engine has been disclosed in Japanese Patent Publication No. Toku Kai Hei 8-254213, and is constructed as shown in FIG. 6. A cylindrical housing 1 has an installation flange 2 formed around its outer peripheral surface on the axial inside end (the inside with reference to the axial direction is the side nearest the engine, and is the right side in all of the figures) and fastened to the cylinder block of the engine by way of the installation flange 2. Provided on the radial inside of the housing 1 is a rolling-bearing unit 6 which comprises a ball bearing 4 on the axial inside end and a roller bearing 5 on the axial outside end (the outside with reference to the axial direction is the side furthest from the engine, and is the left side in all of the figures) in combination to support a rotating shaft 3 such that it rotates freely on the radially inside of the housing 1. There are seal rings 7, 7 located on both ends in the axial direction (left and right direction in FIG. 6) of this rolling-bearing unit 6 that prevent the grease filled inside the bearing unit from leaking out, as well as, prevent foreign matter such as dirt or steam on the outside from getting inside the unit. Moreover, a pulley 8 is fastened to a section on the outside end of the aforementioned rotating shaft 3 that protrudes from the opening on the outside end of the housing 1.

When installed in the engine, a belt (not shown in the figure) is placed around this pulley 8, and it rotates and drives the aforementioned rotating shaft 3 from the crankshaft of the engine. On the other hand, an impeller 9 is fastened to a section on the inside end of the rotating shaft 3 that protrudes from the surface on the inside end of the installation flange 2. When this installation flange 2 is fastened to the cylinder block of the engine, the aforementioned impeller 9 goes inside the water jacket that is formed within this cylinder block. As the rotating shaft 3 rotates, the coolant water inside the water jacket is circulated to and from a radiator (not shown in the figure) or that like.

Furthermore, there is a mechanical seal 10 located between the outer peripheral surface of the rotating shaft 3 and the inner peripheral surface of the housing 1. When the engine is operating, this mechanical seal 10 allows rotation of the rotating shaft 3 while at the same time prevents steam or coolant water that is flowing inside the water jacket, from leaking out. However, with the aforementioned mechanical seal 10, obtaining a perfect seal is difficult, and when friction heat is generated on the seal surface of this mechanical seal 10, the coolant water, which contains chemical matter such as an anti-freeze agent or anti-rust agent, evaporates and becomes steam and leaks out toward the rolling-bearing unit 6, while at the same time, the coolant water in which the aforementioned chemical matter is condensed due to evaporation of the coolant water and also leaks out to the rolling-bearing unit 6. Therefore, a slinger 11 is located in the middle of the rotating shaft 3 between the mechanical seal 10 and the inside seal ring 7, and a supply-discharge hole (not shown in the figure) is formed in the middle of the housing 1 in the section that faces the outer peripheral edge of the slinger 11, which allows the steam or hot water that leaked out from the mechanical seal 10 to freely be discharged outside the housing 10. In other words, the aforementioned supply-discharge hole is provided for communication between the outside and a space which is located between the mechanical seal 10 and the inside seal ring 7 in the axial direction to act as a steam chamber, so that the steam and hot water in this space are discharged to the outside.

In the first example of prior art construction shown in FIG. 6, the inner peripheral edge of a pair of seal lips 12, 12 of the inside seal ring 7 comes in sliding contact all the way around the outer peripheral surface in the middle of the rotating shaft 3. The inside seal ring 7 and aforementioned slinger 11 are not associated with and are independent of each other.

With respect to this, as shown in FIG. 7, Japanese Patent Publication No. Toku Kai Hei 11-153096 discloses a construction for improving the seal performance by locating the seal ring 7a and slinger 11a such that they are associated with each other. In the case of this construction, two of the three lips 12a, 12b and 12c of the seal ring 7a, specifically the seal lips 12a and 12b come in sliding contact all the way around the outer peripheral surface of the rotating shaft 3a. On the other hand, the edge of the remaining seal lip 12c comes in sliding contact all the way around the outside surface of the slinger 11a. With this kind of construction, the seal performance is improved over the first example of prior art construction shown in FIG. 6, and it is possible to more effectively prevent foreign matter such as steam or hot water from getting inside the rolling-bearing unit that supports the rotating shaft 3a.

Moreover, similar to the construction of this invention described later, it is considered that an outer-diameter-side cylindrical section is formed on the outer peripheral edge of the slinger such that it is concentric with the rotating shaft, and that a seal lip is provided with a tip edge such that it is inclined inward in the radial direction toward the tip edge, and that the tip edge comes in sliding contact with the outer peripheral surface of this outer-diameter-side cylindrical section. With this kind of construction, since foreign matter collects on the outer peripheral surface of the aforementioned outer-diameter-side cylindrical section where there is a large centrifugal force due to the large diameter, it is efficiently thrown off by this centrifugal force. Therefore, it is possible to even more effectively prevent foreign matter such as steam or hot water from getting inside the rolling-bearing unit.

In the case of a second example of prior art construction shown in FIG. 7 and in the case of construction where the tip edge of the seal lip comes in sliding contact with the outer peripheral surface of the outer-diameter-side cylindrical section that is formed around the outer peripheral edge of the slinger, the seal is better than the first example of prior art construction shown in FIG. 6. However, in order to be able to effectively prevent foreign matter from getting into the bearing unit over a long period of time, further improvement is desired. In other words, in the case of the construction disclosed in Japanese Patent Publication No. Toku Kai Hei 11-153096 as shown in FIG. 7, only the construction in which the edge of one of the three seal lips 12a, 12b and 12c of the seal ring 7a, that is of the seal lips 12c, comes in sliding contact with the outside surface of the slinger 11a is mentioned, however detailed specifications are not given.

With respect to this point, in order to be able to effectively prevent foreign matter from getting into the bearing unit over a long period of time, it is necessary to satisfy the following conditions (1) and (2).

(1) The tip edge of the seal lip 12c must come in sliding contact all the way with the outside surface of the slinger 11a with sufficient pressure and with no gaps.

(2) Wear of the tip edge of the seal lip 12c due to rubbing with the outside surface of the slinger 11a must be kept to a minimum.

In the case of satisfying only condition (1) above, it is possible to increase the amount of elastic deformation of the seal lip 12c and increase the force to push the tip edge of the seal lip 12c against the outside surface of the slinger 11a. On the other hand, in the case of satisfying only condition (2) above, it is possible to reduce the amount of elastic deformation of the seal lip 12c and decrease the force to push the tip edge of the seal lip 12c against the outside surface of the slinger 11a.

Since the condition (1) above for securing the seal performance is counter to the condition (2) above for securing durability in this way, actual construction for effectively preventing foreign matter from getting inside the bearing unit over a long period of time is very important.

DISCLOSURE OF THE INVENTION

It is an objective of this invention to provide a seal apparatus for a water pump, rotation-support apparatus for a water pump and a water pump, taking the aforementioned problems into consideration.

Of the seal apparatus for a water pump, rotation-support apparatus for a water pump and water pump of this invention, the seal apparatus for a water pump as disclosed in the claims comprises a seal ring provided to block the space between the inner peripheral surface of a non-rotating member, and the outer peripheral surface of the rotating shaft of the water pump that passes through this non-rotating member, the outer peripheral edge of the seal ring being fastened to the inner peripheral surface of the non-rotating member, and a slinger that is fitted around the rotating shaft. Moreover, there is an outer-diameter-side cylindrical section that is formed around the outer peripheral edge of the slinger such that it is concentric with the rotating shaft. Also, the seal ring comprises a first seal lip that comes in sliding contact with an outer peripheral surface of the rotating shaft or with an outer peripheral surface of the slinger that rotates together with the rotating shaft, and a second seal lip that comes in sliding contact with an outer peripheral surface of the outer-diameter-side cylindrical section and that is tilted inward in the radial direction toward the tip edge.

Moreover, the rotation-support apparatus for the water pump as described in the claims comprises: an outer ring having an outer-ring raceway formed around its inner peripheral surface; a rotating shaft for the water pump having an inner-ring raceway formed around its outer peripheral surface; a plurality of rolling elements located between the outer-ring raceway and inner-ring raceway such that they can rotate freely; a seal ring whose outer peripheral edge is fastened to the inner peripheral surface on the end of the outer ring; and a slinger that is fitted around the rotating shaft. Moreover, there is an outer-diameter-side cylindrical section that is formed around the outer peripheral edge of the slinger such that it is concentric with the rotating shaft. Also, the seal ring comprises a first seal lip that comes in sliding contact with an outer peripheral surface of the rotating shaft or with an outer peripheral surface of the slinger that rotates together with the rotating shaft, and a second seal lip that comes in sliding contact with an outer peripheral surface of the outer-diameter-side cylindrical section and that is tilted inward in the radial direction toward the tip edge.

Furthermore, the water pump described in the claims comprises: a housing; an outer-ring raceway that is formed directly around the inner peripheral surface of this housing or formed around a separate outer ring around the inner peripheral surface of this housing; a rotating shaft having an inner-ring raceway that is formed around its outer peripheral surface; a plurality of rolling elements that are located between the outer-ring raceway and inner-ring raceway such that they roll freely; a seal ring whose outer peripheral edge is fastened to the inner peripheral surface on the end of the outer ring; a slinger that is fitted around the rotating shaft; a pulley that is fastened to the outside end of the rotating shaft; an impeller that is fastened to the inside end of the rotating shaft; a mechanical seal that is located between the inner peripheral surface of the housing and the outer peripheral surface of the rotating shaft in the section between the impeller and the slinger in the axial direction; and a space that is located between the mechanical seal and the seal ring in the axial direction. Moreover, there is an outer-diameter-side cylindrical section that is formed around the outer peripheral edge of the slinger such that it is concentric with the rotating shaft. Also, the seal ring comprises a first seal lip that comes in sliding contact with an outer peripheral surface of the rotating shaft or with an outer peripheral surface of the slinger that rotates together with the rotating shaft, and a second seal lip that comes in sliding contact with an outer peripheral surface of the outer-diameter-side cylindrical section and that is tilted inward in the radial direction toward the tip edge.

Particularly, in the case of the seal apparatus for a water pump, the rotation-support for a water pump and the water pump of this invention, the amount of elastic deformation of the second seal lip, which occurs when the tip: edge of the second seal lip comes in contact with the outer peripheral surface of the aforementioned outer-diameter-side cylindrical section, is at least $1/10$ and up to $7/10$ the height of the second seal lip in the free state. In addition, the roughness of the section of the outer peripheral surface of the outer-diameter-side cylindrical section which the tip edge of the second seal lip comes in sliding contact with is from 0.2 $\mu$m to 2.0 $\mu$m in the arithmetic mean Ra, or is from 0.8 $\mu$m to 8.0 $\mu$m in the maximum height Ry.

Preferably, the amount of elastic deformation of the second seal lip is at least $2/10$ and up to $5/10$ the height of the second seal lip in the free state, and even more preferably at least $2/10$ and up to $3/10$ the height in the free state.

Moreover, the cross-sectional shape of the second seal lip is preferably a wedge shape in which the width (thickness) dimension becomes smaller going from the base end to the tip end. At the same time, the length dimension of the second seal lip is at least two times than the average thickness dimension of second seal lip, and preferably at least 2.5 times.

With the seal apparatus for a water pump, the rotation-support for a water pump and the water pump of this invention, constructed as described above, it is possible to effectively prevent foreign matter from getting inside the rolling-bearing unit that supports the rotating shaft of the water pump over a long period of time.

DETAILED DESCRIPTION OF THE PREFERRED EMBODIMENTS

Figure 1:
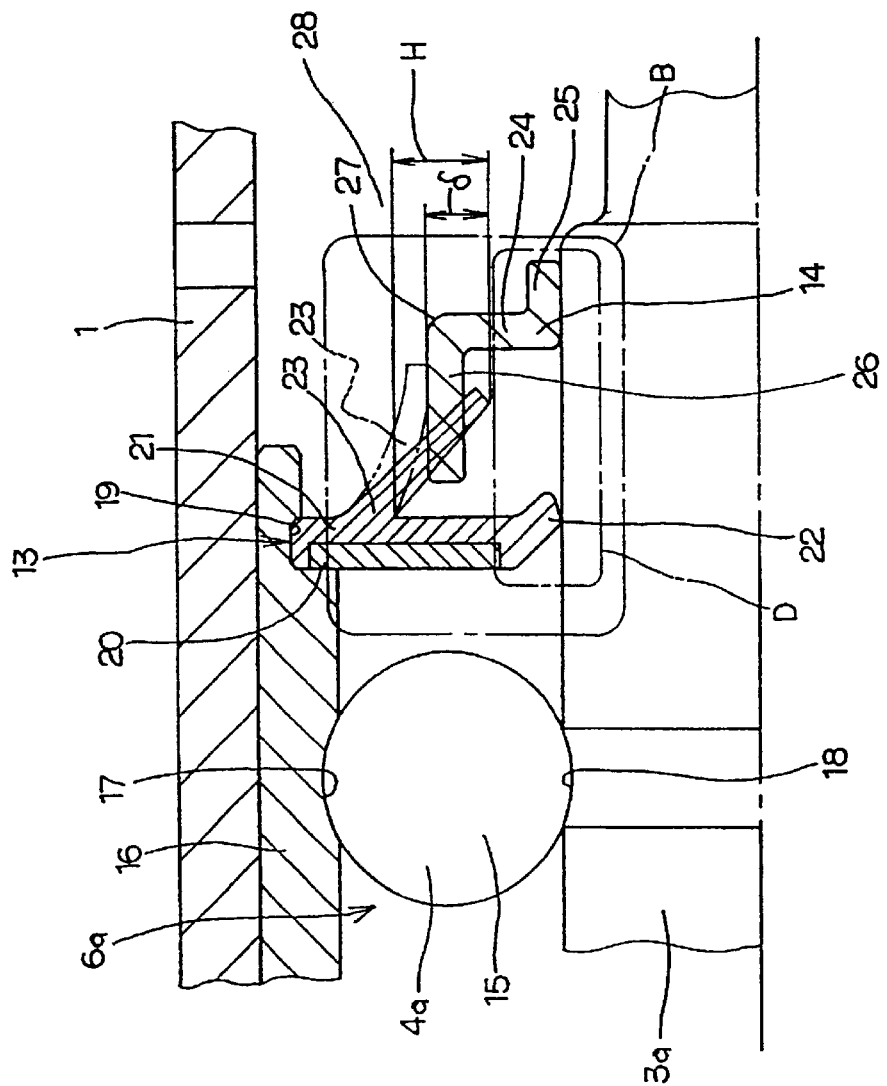
FIG. 1 is a partial, cross sectional view to show a first example of the embodiment of the present invention, corresponding to Portion A of FIG. 6.
Figure 2:
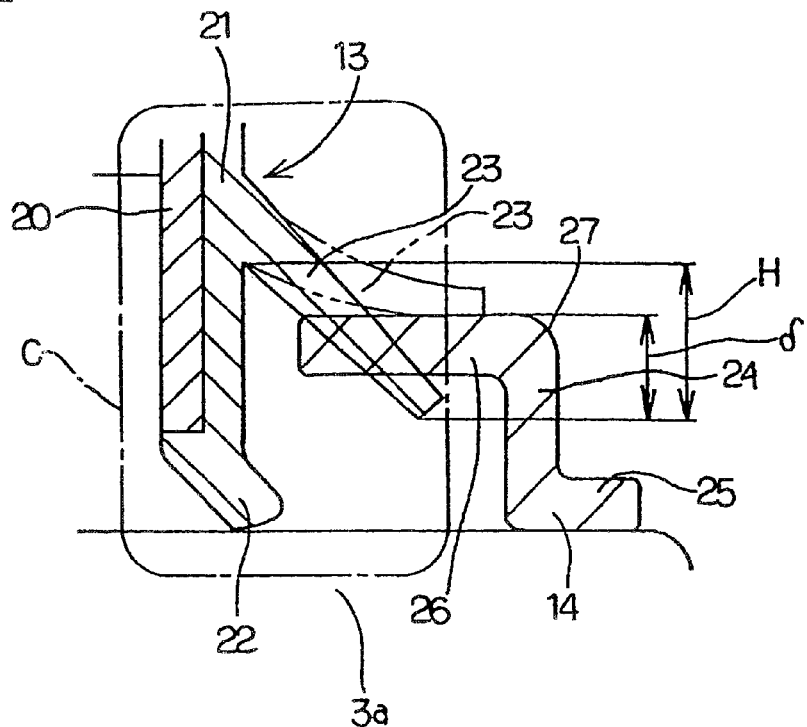
FIG. 2 is a view taken from Portion B in FIG. 1.
Figure 6:
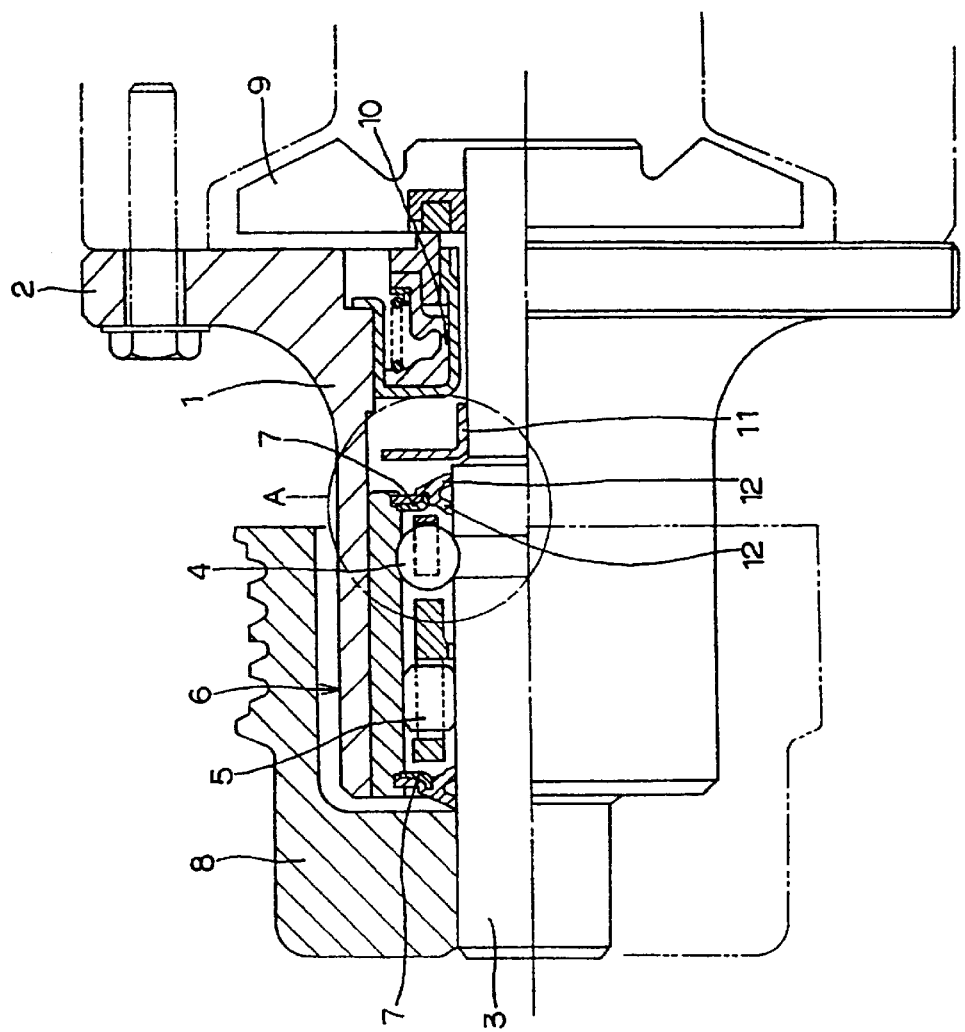
FIG. 6 is a cross sectional view to show a first example of the conventionally known water pump.
Figure 7:
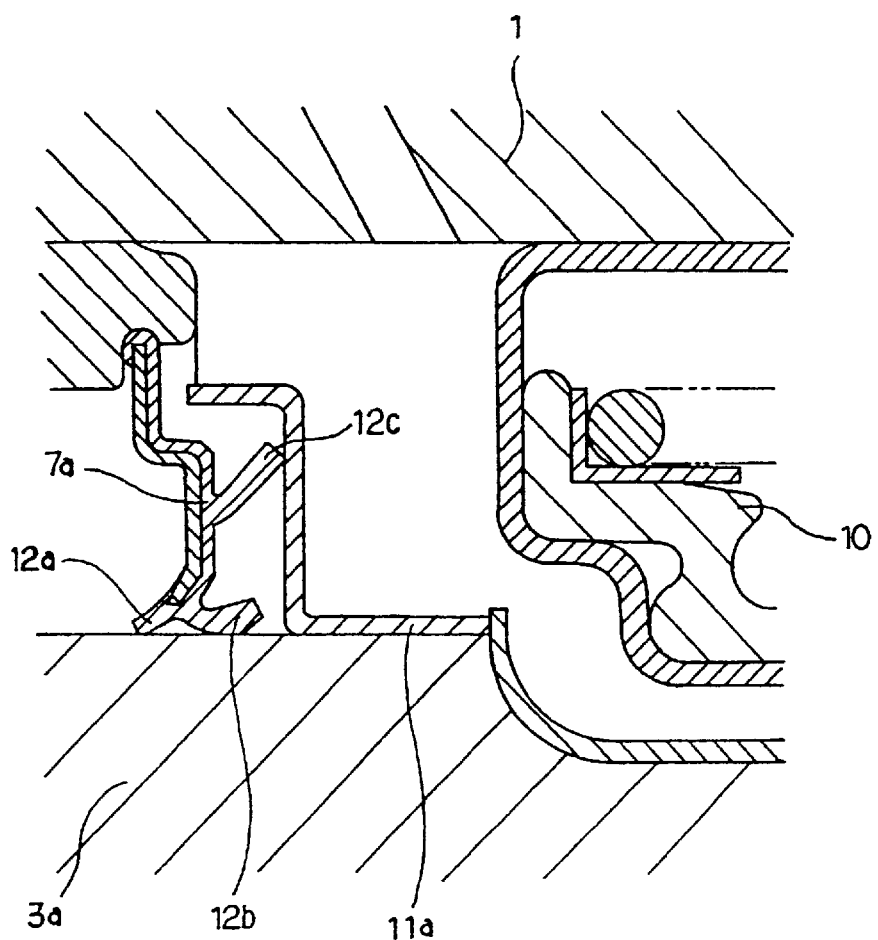
FIG. 7 is a partial, cross sectional view to show a second example of the conventionally known water pump.

FIG. 1 and FIG. 2 show a first example of the embodiment of the present invention. This example is characterized by making it difficult for steam or hot water that passes the mechanical seal 10 to get inside the rolling-bearing unit 6 including the plurality of rolling elements (balls) 15, by adequately regulating the shape and dimensions of the seal ring 13 and slinger 14 that are located in the middle section of the rotating shaft 3a further toward the outside section than the mechanical seal 10 (see FIG. 6). The overall construction of the water pump and the construction and function of other sections are substantially the same as that of a conventional water pump, including the construction shown in FIG. 6, so drawings and explanations of identical sections will be omitted or simplified, and only the sections that are features of this invention or sections that were not previously explained will be explained here.

In order to construct the ball bearing 4a that is part of the aforementioned rolling-bearing unit 6a, rolling elements 15 are rotatively held by a retainer (not shown in the figures) between a deep groove-shaped outer-ring raceway 17, which is formed around the inner peripheral surface of an outer ring 16, and a deep groove-shaped inner-ring raceway 18, which is formed around the outer peripheral surface of the rotating shaft 3a. Also, the outer peripheral edge of the seal ring 13 is fastened to an attachment groove 19 that is formed all the way around the inner peripheral surface on the inside end of the outer ring 16. This seal ring 13 comprises an elastic member 21 made of an elastomer such as rubber that is reinforced by a circular metal core 20. In the example shown in the figures, the outer peripheral edge of this elastic member 21 protrudes further outward in the radial direction than the outer peripheral edge of the metal core 20, and this outer peripheral edge of the elastic member 21 is fastened to the attachment groove 19. However, it is also possible to expose the metal core 20 to the outer peripheral edge of the aforementioned seal ring 13, and to fasten this metal core 20 to the aforementioned attachment groove 19.

The elastic material 21 comprises a first seal lip 22 and a second seal lip 23. Of these, the first seal lip 22 is formed around the inner peripheral edge of the seal ring 13, so it comes into sliding contact all the way around the outer peripheral surface of the middle section of the rotating shaft 3a. In other words, the inner diameter of the first seal lip 22 in the free state is a little smaller than the outer diameter in the middle section of the rotating shaft 3a, and when the rotating shaft 3a is inserted into the inner-diameter side of the first seal lip 22, the inner peripheral edge of this first seal lip 22 comes in elastic contact all the way around the outer peripheral surface of the middle section of the rotating shaft 3a.

The second seal lip 23 extends to the inside from a side surface of the elastic member 21 in a state where it is tilted inward in the radial direction toward its tip edge. The cross-sectional shape of this second seal lip 23 is a wedge shape where the width (thickness) dimension becomes smaller from the base toward the tip. At the same time, the length dimension of the second seal lip 23 is such that it is at least two times and desirably at least 2.5 times the average thickness of the second seal lip 23. The tip edge of this second seal lip 23 comes in sliding contact all the way around the outer peripheral surface of the outer-diameter-side cylindrical section 26 that is formed on the outer peripheral edge of the slinger 14, which will be described later, and is concentric with the rotating shaft 3a. In this state, the second seal lip 23 is bent (curled) such that it has a circular arc-shaped cross section.

The aforementioned slinger 14 is thus fitted around and fixed to the middle section of the rotating shaft 3a in the section that is adjacent to the inside of the seal ring 13 and made of anti-corrosive metal plate such as stainless steel plate or steel plate for which anti-corrosion surface treatment has been performed such that at least the surface where the tip edge of the second seal lip 23 comes in contact does not corrode, and is formed by bending it generally into a ring shape having a crank-shaped cross section. In other words, the slinger 14 comprises: an inner-diameter-side cylindrical section 25 that is formed by bending at a right angle the inner peripheral edge of the circular section 24 to the inside in the axial direction; and an outer-diameter-side cylindrical section 26 that is similarly formed by bending at a right angle the outer peripheral edge to the outside in the axial direction and is concentric with the inner-diameter-side cylindrical section 25. By tightly fitting the inner-diameter-side cylindrical section 25 onto the middle section of the rotating shaft 3a with an interference fit, the slinger 14 is fastened around the outer peripheral surface of the middle section of the rotating shaft 3a. In this state, the outer-diameter-side cylindrical section 24 is supported and fastened around the rotating shaft 3a such that it is concentric with the rotating shaft 3a. Also, the tip end of the second seal lip 23 comes in sliding contact all the way around the outer peripheral surface of the outer-diameter-side cylindrical section 26. The roughness of the outer peripheral surface of the outer-diameter-side cylindrical section 26 supported as mentioned above, against which the tip edge of the second seal lip 23 comes in sliding contact in this way, is such that the arithmetic mean roughness Ra is from 0.2 $\mu$m to 2.0 $\mu$m or the maximum height Ry is from 0.8 $\mu$m to 8.0 $\mu$m.

In the case of this invention, by adequately regulating the diameter (inner diameter) of the tip edge of the second seal lip 23 when, in the free state, and the outer diameter of the outer-diameter-side cylindrical section 26, the amount of elastic deformation 6 of the second seal lip 23 (amount of elastic compression in the radial direction from the free state) when assembled as shown by the dot-dash line in FIG. 1 and FIG. 2, is at least 1/10 and up to 7/10 the height H of the second seal lip 23 in the free state as shown by the solid line in the figure (H/10≦δ≦7H/10). Preferably, this amount of elastic deformation δ should be at least 2/10 and up to 5/10 the height H of the second seal lip 23 in the free state as shown by the solid line in the figure (2H/10≦δ≦5H/10), and even more preferably at least 2/10 and up to 3/10 (2H/10≦δ≦3H/10). There is a curved section 27 with a circular-arc-shaped cross section located in the section that connects the base of the outer-diameter-side cylindrical section 26 with the outer peripheral edge of the circular section 24, and the positions in the axial direction of the seal ring 13 and slinger 14 are regulated such that the tip edge of the second seal lip 23 does not touch this curved section 27. This is so that it will be possible to regulate the amount of elastic deformation δ as desired.

With this example, constructed as described above, it is possible over a long period of time to effectively prevent foreign matter such as steam or hot water from getting inside the rolling-bearing unit 6a, which supports the rotating shaft 3a of the water pump.

First, the reason that it is possible to improve the seal performance for preventing foreign matter from getting inside the bearing unit will be explained.

First, since the second seal lip 23 is tilted inward in the radial direction toward tile tip edge, it is possible to obtain an excellent prevention effect against the progression of foreign matter. In other words, when foreign matter that is trying to get inside the rolling-bearing unit 6a reaches inside the space 28 between the rolling-bearing unit 6a and the mechanical seal 10 (see FIG. 6), it presses again the outer peripheral surface of the second seal lip 23. This pressure force acts in the direction that pushes the tip edge of the second seal lip 23 against the outer peripheral surface of the outer-diameter-side cylindrical section 26. Therefore, it becomes very difficult for gaps to occur in the section between the tip edge of the second seal lip 23 and the outer peripheral surface of the outer-diameter-side cylindrical section 26.

Also, when this section is exposed to (hit by) high-temperature steam and coolant water containing condensed chemicals such as an anti-freezing agent or anti-corrosion agent, the second seal lip 23 swells due to the synergistic action of these two substances (steam and coolant water) and deforms in the circumferential direction as in a wave form, so even when gaps occur in a few places in the area of contact between the tip edge of the second seal lip 23 and the outer peripheral surface of the outer-diameter-side cylindrical section 26 and foreign matter tries to get inside the rolling-bearing unit 6a through the gaps, the foreign matter, before it can get into the gaps, is thrown outward in the radial direction by the centrifugal force that is applied to the foreign matter by contact with the outer peripheral surface of the outer-diameter-side cylindrical section 26 that rotates together with the rotating shaft 3a. The centrifugal force that is applied to the foreign matter is larger as the outer diameter of the outer-diameter-side cylindrical section 26 is larger, so it is possible to discharge the foreign matter efficiently, and to effectively prevent foreign matter from getting inside the rolling-bearing unit 6a.

Second, since the amount of compression δ of the second seal lip 23 is secured at least 1/10 the height H of the second seal lip 23 in the free state (δ≧H/10), it is possible to secure the contact pressure at the area of sliding contact between the tip edge of the second seal lip 23 and the outer peripheral surface of the outer-diameter-side cylindrical section 26 that occurs due to the elastic deformation of the second seal lip 23. Therefore, it is difficult for gaps to occur at the area of sliding contact, making it possible to improve the seal performance. Moreover, by securing the amount of elastic deformation 6 of the second seal lip 23 at least 2/10 the height H of the second seal lip 23 in the free state (δ☐2H/10), it is possible to even more effectively improve the seal performance.

Figure 3:
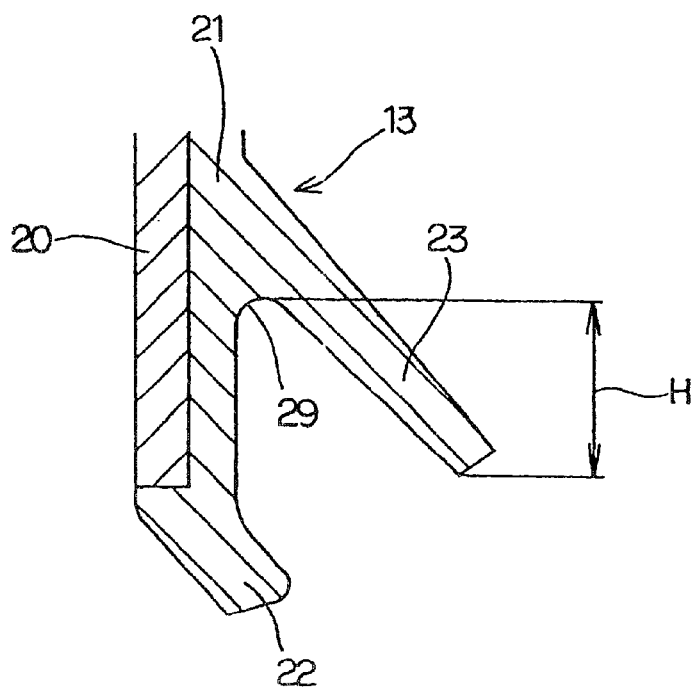
FIG. 3 is a view to show another shape of the second seal lip, corresponding to Portion C of FIG. 2.

As can be clearly seen from FIG. 1, the height H of the second seal lip 23 in the free state is the distance in the radial direction from the inner peripheral edge at the base of the second seal lip 23 to the tip edge of the second seal lip 23. The larger this distance or the height H in the free state is, the easier it for elastic deformation of the second seal lip 23. When the section on the inner peripheral edge at the base of the second seal lip 23 is the curved section 29 having a circular-arc-shaped cross-section as shown in FIG. 3, the height H in the free state is the distance in the radial direction from the bottom of the curved section 29 to the tip edge of the second seal lip 23.

Next, the reason that it is possible to improve durability for maintaining the prevention of the progression of foreign matter over a long period of time is explained.

First, since the amount of elastic deformation δ of the second seal lip 23 is kept up to 7/10 the height H of the second seal lip 23 in the free state (δ≦7H/10), it is possible to prevent the contact pressure at the area of sliding contact between the tip edge of the second seal lip 23 and the outer peripheral surface of the outer-diameter-side cylindrical section 26, which occurs due to the elastic deformation of the second seal lip 23, from becoming excessively large. Therefore, it is possible to suppress friction and the area of contact and keep wear of the tip edge of the second seal lip 23 to a minimum.

Second, the arithmetic mean roughness Ra of the outer peripheral surface of the outer-diameter-side cylindrical section 26 against which the tip edge of the second seal lip 23 comes in contact, is regulated at from 0.2 μm to 2.0 μm, or the maximum height Ry is regulated at from 0.8 μm to 8.0 μm (by keeping the value of at least one of the arithmetic mean roughness Ra and the maximum height Ry within the aforementioned range, the surface is a smooth surface with little roughness), so the tip edge does not rub forcibly against the outer peripheral surface, and thus making it possible to keep wear of the tip edge to a minimum. When the arithmetic mean roughness Ra of the outer peripheral surface exceeds 2.0 μm, and the maximum height Ry exceeds 8.0 μm, wear of the tip edge becomes severe, and it becomes difficult to sufficiently secure durability. In contrast, when the arithmetic mean roughness Ra is less than 0.2 μm, or when the maximum height Ry is less than 0.8 μm, the processing cost greatly increases and it is not possible to expect more effect in improving the durability. The slinger 14 is made of anti-corrosive metal plate such that the surface of at least the section on the outer peripheral surface of the outer-diameter-side cylindrical section 26 where the tip edge of the second seal lip 23 comes in sliding contact does not corrode, so roughness of the outer peripheral surface does not become worse due to corrosion, so that it is possible to maintain the function of preventing wear over a long period of time.

Wear of the tip edge of the second seal lip 23 is suppressed in this way so even when the water pump is used over a long period of time, there is proper contact at the area of sliding contact between the tip edge of the second seal lip 23 and the outer peripheral surface of the outer-diameter-side cylindrical section 26, and it is possible to secure the seal performance at this area of sliding contact. It is necessary to keep at least either the value of the arithmetic mean roughness Ra or the maximum height Ry within the aforementioned respective ranges, and, it is possible to improve durability even more by keeping both values within the aforementioned ranges.

Figure 4:
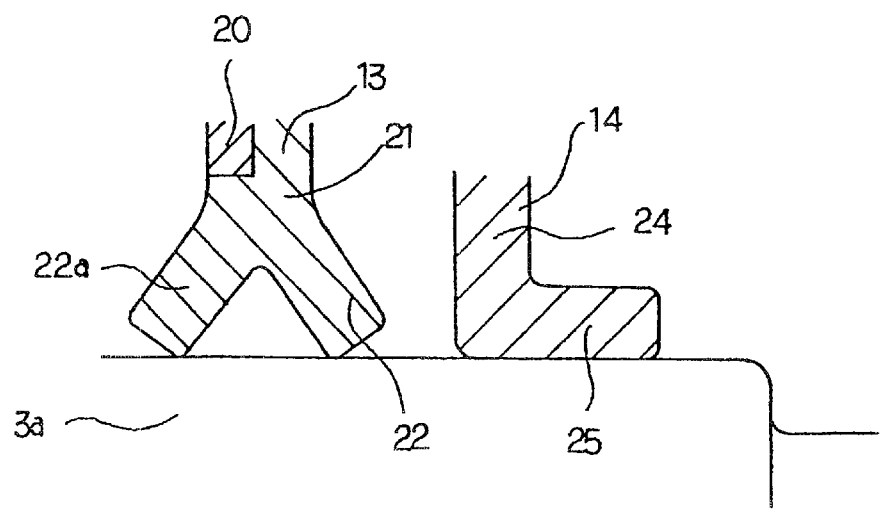
FIG. 4 is a partial, cross sectional view to show a second example of the embodiment of the present invention, corresponding to Portion D of FIG. 1.
Figure 5:
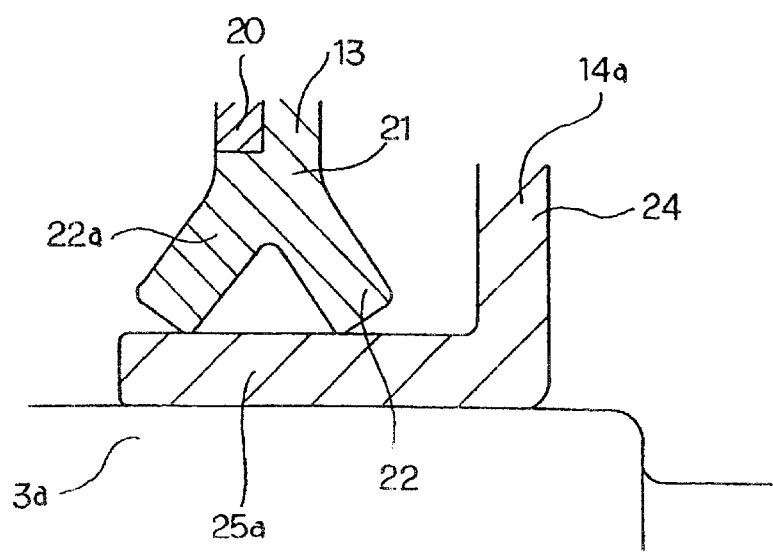
FIG. 5 is a view to show a third example of the embodiment of the present invention, similar to FIG. 4.

Next, FIG. 4 and FIG. 5 show a second and third example of the embodiment of the present invention. In the first embodiment of the invention described above, only a first seal lip 22 comes in sliding contact with the outer peripheral surface of the rotating shaft 3a, while in the second and third examples of the present invention, there are two first seal lips 22, 22a that are tilted in opposite directions from each other. The first seal lip 22a, which tilts to the outside in the axial direction as it extends toward the inner-diameter side, functions well and has an excellent effect on preventing the grease inside the rolling-bearing unit from leaking out. In the case of the second example shown in FIG. 4, the two seal lips 22, 22a come in sliding contact with the outer peripheral surface of the rotating shaft 3a. On the other hand, in the case of the third example shown in FIG. 5, the two seal lips 22, 22a come in sliding contact with the outer peripheral surface of the inner-diameter-side cylindrical section 25a of the slinger 14a which is fitted around the rotating ring 3a. The cross-sectional shape of the slinger 14a used in this third example is a channel shape. The other construction and functions are the same as in the case of the first embodiment, so figures and a detailed explanation of identical parts is omitted.

When fitting the tip edge of the second seal lip 23 (see FIGS. 1 to 3) around the outer-diameter-side cylindrical section 26 of the slingers 14, 14a when assembling this invention, care must be taken that the second seal lip 23 does not get rolled up. In order to do this, an assembly method can be used in which the tip edge of the second seal lip 23 is fitted around a cylindrical retaining sleeve having an inner diameter that is a little larger than the outer-diameter-side cylindrical section 26, and then after placing the tip edge of the second seal lip 23 around the outer-diameter-side cylindrical section 26, the retaining sleeve is removed from the inner-diameter side of the second seal lip 23. Also, it is possible to form a conical-shaped guide section on the end of the outer-diameter-side cylindrical section 26 such that its outer diameter becomes smaller toward the tip, and it is then possible to use this guide section to fit the tip edge of the second seal lip 23 around the outer-diameter-side cylindrical section 26. The outer diameter of the tip end of the guide section is equal to or less than the inner diameter of the tip edge of the second seal lip 23 in the free state. In the case of using this kind of construction, there of course should be no interference between the guide section and the main part of the seal ring 13, and when the seal has been completely installed, the tip edge of the second seal lip 23 should no longer come in contact with the outer peripheral surface of this guide section.

Industrial Application:

Constructed and functioning as described above, this invention makes it possible to improve the durability of a water pump without increasing cost and size of the water pump.

What is claimed is:

1. A seal apparatus for a water pump provided between a non-rotating member having an inner peripheral surface and a rotating shaft of the water pump inserted into the non-rotating member and having an outer peripheral surface; comprising a seal ring having an outer peripheral edge fastened to the inner peripheral surface of the non-rotating member, and a slinger having an outer peripheral surface and fitted around the rotating shaft to block between the inner peripheral surface of the non-rotating member and the outer peripheral surface of the rotating shaft of the water pump, the slinger having an outer peripheral edge formed with an outer-diameter-side cylindrical section which is concentric with the rotating shaft and has an outer peripheral surface, the seal ring comprising a first seal lip that comes in sliding contact with the outer peripheral surface of the slinger that rotates together with the rotating shaft, a second seal lip that has a tip edge which comes in sliding contact with the outer peripheral surface of the outer-diameter-side cylindrical section, and that is tilted inward in the radial direction toward the tip edge thereof, wherein the amount of elastic deformation of the second seal lip, which occurs when the tip edge of the second seal lip comes in contact with the outer peripheral surface of the outer-diameter-side cylindrical section, is at least $\frac{1}{10}$ and up to $\frac{7}{10}$ the height of the second seal lip in a free state, and the roughness of a section of the outer peripheral surface of the outer-diameter-side cylindrical section with which the tip edge of the second seal lip comes in sliding contact is from 0.2 $\mu$m to 2.0 $\mu$m in the arithmetic mean Ra, or is from 0.8 $\mu$m to 8.0 $\mu$m in the maximum height Ry, and a third seal lip coming in sliding contact with the outer peripheral surface of the slinger.

2. A rotation-support apparatus for a water pump comprising: an outer ring having an inner peripheral surface formed with an outer ring raceway, a rotating shaft for the water pump having an outer peripheral surface formed with an inner ring raceway, a plurality of rolling elements rotatably located between the outer-ring raceway and inner-ring raceway, a seal having an outer peripheral edge fastened to the inner peripheral surface of the outer ring at one end thereof, and a slinger having an outer peripheral surface and fitted around the rotating shaft, the slinger having an outer peripheral edge formed with an outer-diameter-side cylindrical section which is concentric with the rotating shaft and has an outer peripheral surface, the seal ring comprising a first seal lip that comes in sliding contact with the outer peripheral surface of the slinger that rotates together with the rotating shaft, a second seal lip that has a tip edge which comes in sliding contact with the outer peripheral surface of the outer-diameter-side cylindrical section, and that is tilted inward in the radial direction toward the tip edge thereof, wherein the amount of elastic deformation of the second seal lip, which occurs when the tip edge of the second seal lip comes in contact with the outer peripheral surface of the outer-diameter-side cylindrical section, is at least $\frac{1}{10}$ and up to $\frac{7}{10}$ the height of the second seal lip in a free state, and the roughness of a section of the outer peripheral surface of the outer-diameter-side cylindrical section with which the tip edge of the second seal lip comes in sliding contact is from 0.2 $\mu$m to 2.0 $\mu$m in the arithmetic mean Ra, or is from 0.8 $\mu$m to 8.0 $\mu$m in the maximum height Ry, and a third seal lip coming in sliding contact with the outer peripheral surface of the slinger.

3. A water pump comprising a housing having an inner peripheral surface; an outer-ring raceway that is formed directly around the inner peripheral surface of this housing or formed around a separate outer ring around the inner peripheral surface of this housing, a rotating shaft having an outer peripheral surface formed with an inner-ring raceway, a plurality of rolling elements rotatably located between the outer-ring raceway and inner-ring raceway, a seal ring having an outer peripheral edge fastened to the inner peripheral surface of the outer ring at one end thereof, a slinger having an outer peripheral surface and fitted around the rotating shaft, a pulley fastened to the rotating shaft at an outer end thereof, an impeller fastened to the rotating shaft at an inner end thereof, a mechanical seal provided between the inner peripheral surface of the housing and the outer peripheral surface of the rotating shaft and axially between the impeller and the slinger, and a space provided axially between the mechanical seal and the seal ring, the slinger having an outer peripheral edge formed with an outerdiameter-side cylindrical section which is concentric with the rotating shaft and has an outer peripheral surface, the seal ring comprising a first seal lip that comes in sliding contact with the outer peripheral surface of the slinger that rotates together with the rotating shaft, a second seal lip that has a tip edge which comes into sliding contact with the outer peripheral surface of the outer-diameter-side cylindrical section, and that is tilted inward in the radial direction toward the tip edge, wherein the amount of elastic deformation of the second seal lip, which occurs when the tip edge of the second seal lip comes in contact with the outer peripheral surface of the outer-diameter-side cylindrical section, is at least $1/10$ and up to $7/10$ the height of the second seal lip in a free state, and the roughness of a section of the outer peripheral surface of the outer-diameter-side cylindrical section with which where the tip edge of the second seal lip comes in sliding contact is from 0.2 $\mu$m to 2.0 $\mu$m in the arithmetic mean Ra, or is from 0.8 $\mu$m to 8.0 $\mu$m in the maximum height Ry, and a third seal lip coming in sliding contact with the outer peripheral surface of the slinger.

* * * * *